(12) United States Patent
Spector

(10) Patent No.: US 12,081,551 B2
(45) Date of Patent: Sep. 3, 2024

(54) SYSTEMS AND METHODS FOR PROVIDING ONLINE SECURITY

(71) Applicant: JPMORGAN CHASE BANK, N.A., New York, NY (US)

(72) Inventor: Howard Spector, Woolwich, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 258 days.

(21) Appl. No.: 17/395,753

(22) Filed: Aug. 6, 2021

(65) Prior Publication Data

US 2023/0043208 A1 Feb. 9, 2023

(51) Int. Cl.
*H04L 9/40* (2022.01)
*G06Q 20/40* (2012.01)
*H04L 67/141* (2022.01)

(52) U.S. Cl.
CPC ......... *H04L 63/102* (2013.01); *G06Q 20/401* (2013.01); *H04L 63/0876* (2013.01); *H04L 63/1425* (2013.01); *H04L 63/20* (2013.01); *H04L 67/141* (2013.01)

(58) Field of Classification Search
CPC .............. H04L 63/102; H04L 63/0876; H04L 63/1425; H04L 63/20; H04L 67/141; G06Q 20/401
See application file for complete search history.

(56) References Cited

U.S. PATENT DOCUMENTS

| | | | |
|---|---|---|---|
| 8,276,190 B1* | 9/2012 | Chang | H04L 63/0815 713/176 |
| 10,002,351 B1* | 6/2018 | Spector | G06Q 20/322 |
| 10,715,563 B1* | 7/2020 | Sutherland | H04L 65/1069 |
| 2008/0110983 A1 | 5/2008 | Ashfield | |
| 2009/0006861 A1 | 1/2009 | Bemmel | |
| 2011/0321133 A1* | 12/2011 | Grieve | G06F 21/31 726/4 |
| 2015/0312038 A1* | 10/2015 | Palanisamy | G06Q 20/385 713/155 |

(Continued)

OTHER PUBLICATIONS

International Search Report, dated Nov. 28, 2022, from corresponding International Application No. PCT/US2022/074591.

(Continued)

*Primary Examiner* — Oleg Korsak
(74) *Attorney, Agent, or Firm* — GREENBERG TRAURIG LLP

(57) ABSTRACT

A method for providing online security may include: (1) receiving, by a validation computer program executed by a trusted entity backend for a trusted entity, a call from a web browser executed on a customer electronic device browsing a webpage for an online entity, the call comprising an online entity identifier for the online entity and a session identifier, wherein the webpage for the online entity may include a hidden <iframe> comprising code that causes the web browser to execute the call; (2) confirming, by the validation computer program, that a cookie for the trusted entity may be stored on the customer electronic device; and (3) returning, by the validation computer program, a first value indicating that the customer electronic device is known to the trusted entity or a second value indicating that the customer electronic device is not known to the trusted entity based on the confirmation.

15 Claims, 10 Drawing Sheets

(56) References Cited

U.S. PATENT DOCUMENTS

| | | | |
|---|---|---|---|
| 2016/0277421 A1* | 9/2016 | Lahoz | G06Q 20/3821 |
| 2018/0227303 A1* | 8/2018 | Caldera | H04L 63/10 |
| 2019/0370856 A1* | 12/2019 | Cahn | H04L 43/062 |
| 2020/0053111 A1* | 2/2020 | Jakobsson | H04L 63/1416 |
| 2020/0193435 A1* | 6/2020 | Spector | G06Q 20/401 |
| 2021/0035100 A1 | 2/2021 | Nanduri et al. | |
| 2021/0058395 A1* | 2/2021 | Jakobsson | H04L 67/306 |

OTHER PUBLICATIONS

Written Opinion of the International Searching Authority, dated Nov. 28, 2022, from corresponding International Application No. PCT/US2022/074591.

* cited by examiner

SYSTEMS AND METHODS FOR PROVIDING ONLINE SECURITY

BACKGROUND OF THE INVENTION

1. Field of the Invention

Embodiments relate generally to systems and methods for providing online security.

2. Description of the Related Art

Merchants and other companies that have a web presence are constantly fighting bots and fraudulent users that are attempting to access their services.

SUMMARY OF THE INVENTION

Systems and methods for providing online security are disclosed. According to one embodiment, a method for providing online security may include: (1) receiving, by a validation computer program executed by a trusted entity backend for a trusted entity, a call from a web browser executed on a customer electronic device browsing a webpage for an online entity, the call comprising an online entity identifier for the online entity and a session identifier, wherein the webpage for the online entity may include a hidden <iframe> comprising code that causes the web browser to execute the call; (2) confirming, by the validation computer program, that a cookie for the trusted entity may be stored on the customer electronic device; and (3) returning, by the validation computer program, a first value indicating that the customer electronic device is known to the trusted entity or a second value indicating that the customer electronic device is not known to the trusted entity based on the confirmation.

In one embodiment, the method may further include receiving, by the validation computer program, a login from an application executed by the customer electronic device; and storing by the validation computer program, the cookie on the customer electronic device.

In one embodiment, the code in the hidden <iframe> may include a URL for the trusted entity for the call and the online entity identifier.

In one embodiment, the method may further include receiving, by the validation computer program, a request for information from the online entity; sending, by the validation computer program and to the customer electronic device, a request to approve release of the information to the online entity; receiving, by the validation computer program and from the customer electronic device, approval to release the information to the online entity; and releasing, by the validation computer program, the information to the online entity. The request to approve release of the information may be communicated to an application for the trusted entity executed by the customer electronic device.

In one embodiment, the method may further include receiving, by the validation computer program and from the customer electronic device, an amount of the information to release to the online entity. The validation computer program releases the information to the online entity in accordance with the amount of information.

According to anther embodiment, a method for providing online security may include: (1) receiving, by a validation computer program executed by a backend for a consortium of trusted entities, a call from a web browser executed on a customer electronic device browsing a webpage for an online entity, the call comprising an online entity identifier for the online entity, a first session identifier, and a first hash value derived from the online entity identifier, wherein the webpage for the online entity may include a hidden <iframe> comprising code that causes the web browser to execute the call; (2) generating, by the validation computer program, a first generated hash value based on the online entity identifier, the first session identifier, and a shared secret for the online entity; (3) confirming, by the validation computer program, that the first generated hash value matches the first hash value; (4) confirming, by the validation computer program, that a cookie for the consortium of trusted entities may be stored on the customer electronic device; and (5) returning, by the validation computer program, a first value indicating that the customer electronic device is known to the consortium of trusted entities or a second value indicating that the customer electronic device is not known to the consortium of trusted entities based on the confirmation.

In one embodiment, the method may further include receiving, by the validation computer program, the shared secret for the online entity in a registration process for the online entity.

In one embodiment, the method may further include receiving, by the validation computer program and from a second web browser trusted entity website, a second call comprising a trusted entity identifier, a second session identifier, and the first hash value; generating, by the validation computer program, a second generated hash value based on the trusted entity identifier, the second session identifier, and the shared secret; confirming, by the validation computer program, that the second generated hash value matches the first hash value; generating or updating, by the validation computer program, the cookie in response to the confirmation; and storing, by the validation computer program, the cookie on the customer electronic device.

In one embodiment, the method may further include receiving, by the validation computer program and from a second web browser browsing a trusted entity website, a second call comprising a trusted entity identifier, a second session identifier, and the first hash value; generating, by the validation computer program, a second generated hash value based on the trusted entity identifier, the second session identifier, and the shared secret; determining, by the validation computer program, that the second generated hash value matches the first hash value; and executing, by the validation computer program, a security action in response to the second generated hash value not matching the first hash value.

In one embodiment, the trusted entity website may include a second hidden <iframe> comprising code that causes the web browser to execute the call, a URL for the consortium of trusted entities, the trusted entity identifier, and the first hash value.

In one embodiment, the security action may include unregistering the customer electronic device.

In one embodiment, the method may further include receiving, by the validation computer program, a request for information from the online entity; sending, by the validation computer program and to the customer electronic device, a request to approve release of the information to the online entity; receiving, by the validation computer program and from the customer electronic device, approval to release the information to the online entity; and releasing, by the validation computer program, the information to the online entity.

In one embodiment, the request to approve release of the information may be communicated to an application for one of the trusted entities in the consortium of trusted entities.

In one embodiment, the method may further include receiving, by the validation computer program and from the customer electronic device, an amount of the information to release to the online entity. The validation computer program releases the information to the online entity in accordance with the amount of information.

According to another embodiment, a method for authorization may include: (1) receiving, at an issuer computer program at a backend for a financial institution and from a payment network, a transaction authorization request for a transaction with an online entity comprising a device verification value for a customer electronic device, wherein the device verification value may be provided by a trusted entity and indicates whether the customer electronic device is known to the trusted entity; (2) confirming, by the issuer computer program, that the device verification value matches a stored device verification value for the customer electronic device; and (3) authorizing, by the issuer computer program, the transaction in response to the confirmation.

In one embodiment, the device verification value may be provided in field 104 of the transaction authorization request.

In one embodiment, the issuer computer program may further receive a merchant identifier with the transaction authorization request.

In one embodiment, the issuer computer program may further confirm the device verification value with the trusted entity.

In one embodiment, the issuer computer program may further receive a device validation request from the online entity.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments relate generally to systems and methods for providing online security.

Embodiments may provide an entity having an online presence, such as a merchant, with code that enable interaction with a trusted entity, such as a financial institution, to determine whether a browser is known to the trusted entity. The trusted entity may verify the browser and return an indicator to the merchant. For example, a merchant may use this during checkout in order to confirm the merchant is interacting with a real customer, and not a bot or a fraudster. In one embodiment, a risk indicator, such as a flag, may be provided instead of an actual customer identity.

In one embodiment, the trusted entity may be a consortium that may be provided with an additional layer of redirection. In one embodiment, when an entity in the consortium detects that an electronic device has been compromised, it may alert the consortium, which may update any other participating entities that the electronic device should be treated as suspect.

Embodiments may integrate with wireless network providers (e.g., cellular service providers) to receive notifications that an electronic device has been lost, stolen, and/or compromised.

In one embodiment, information may be shared with a customer using an out of band push notification to the customers device.

Embodiments may be used to augment existing bot detection and enable stronger validation that this is a customer's device and not a fraudster attempting to create an account or access services.

Figure 1:
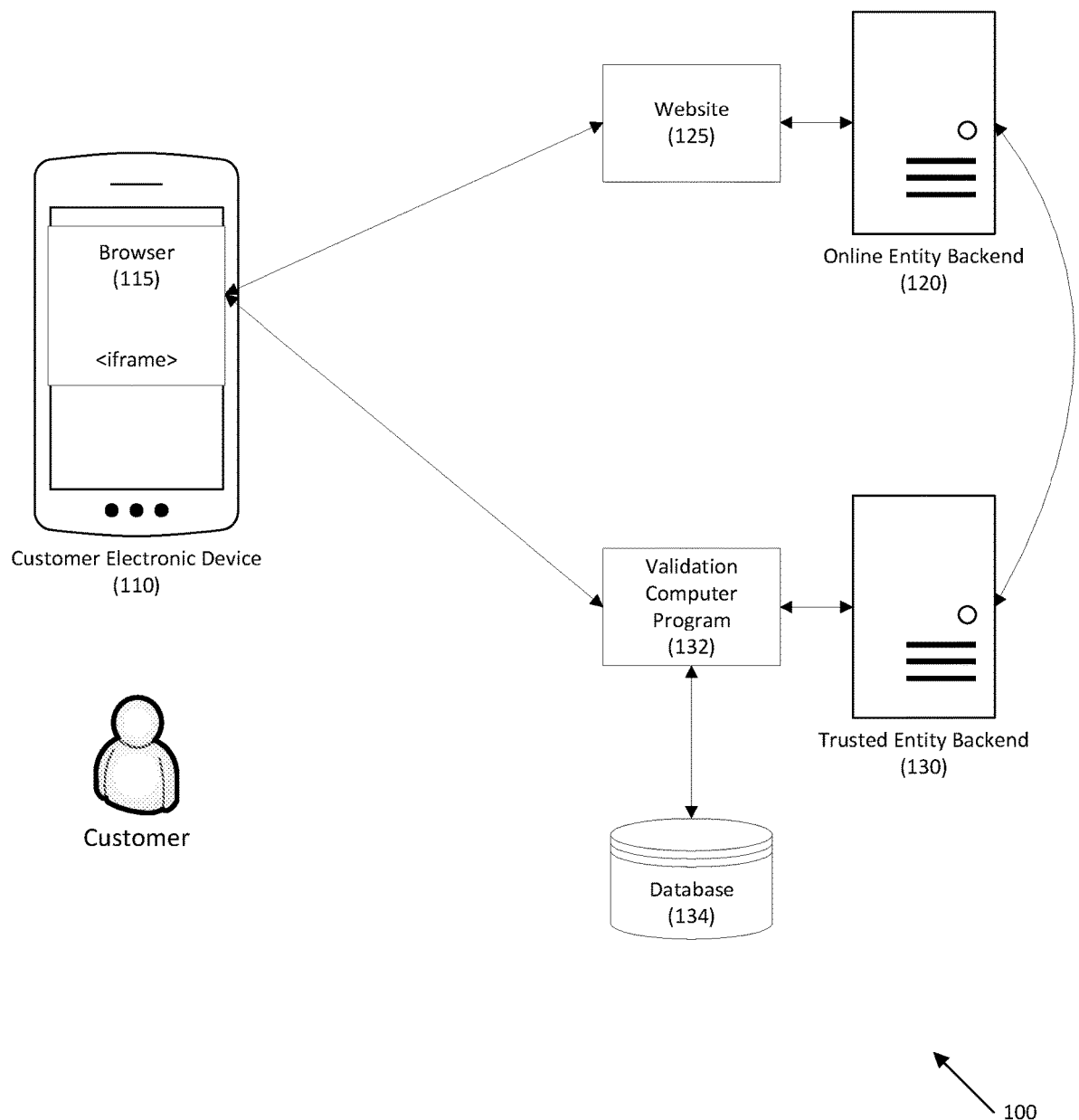
FIG. 1 depicts a system for trusted entity-provided online security according to an embodiment.

FIG. 1 depicts a system for trusted entity-provided online security according to an embodiment. System 100 may include customer electronic device 110, which may be any suitable electronic device, including computers (e.g., workstations, desktops, notebooks, tablets, etc.), smart devices (e.g., smart phones), Internet of Things ("IoT") devices, etc. Electronic device 110 may execute browser 115 that may access website 125 hosted by online entity backend 120.

Online entity backend 120 may be for any suitable online entity, including merchants, subscription services, service providers, financial institutions, etc.

Browser 115 may further communicate with validation computer program 132 that may be provided by trusted entity backend 130. Trusted entity backend 130 may be provided by any suitable trusted entity, including financial institutions, government agencies, security providers, a trusted cloud service provider, a network operator (e.g., mobile network operator, Internet Service Provider, etc.), consortiums, etc. In one embodiment, after receiving a communication from browser 115, such as a login, trusted entity backend 130 may store a cookie on electronic device 110.

In one embodiment, browser 115 may receive a hidden <iframe> from website 125.

After receiving a communication from browser 115, validation computer program 132 may determine whether it recognizes electronic device 110 based on the presence of a cookie. If the cookie is present, validation computer program 132 may return a value (e.g., a device verification value) to browser 115 indicating that electronic device 110 is known; if the cookie is not present, validation computer program 132 may return a value to browser 115 indicating that electronic device 110 is not known.

In one embodiment, the device verification value may be signed by validation computer program 132 to prevent spoofing.

In one embodiment, validation computer program 132 may store an association between electronic device 110 and the cookie(s) stored on electronic device 110 in database 134.

In one embodiment, website 125 may provide the device verification value to online entity backend 120, and online entity backend may call to trusted entity backend to verify or validate the device verification value.

In embodiments, a Standard Perimeter Security as a Service (PSaaS), Shape and other industry techniques may be leveraged to ensure that customer electronic device 110, the IP address, etc., are to be trusted.

Figure 2:
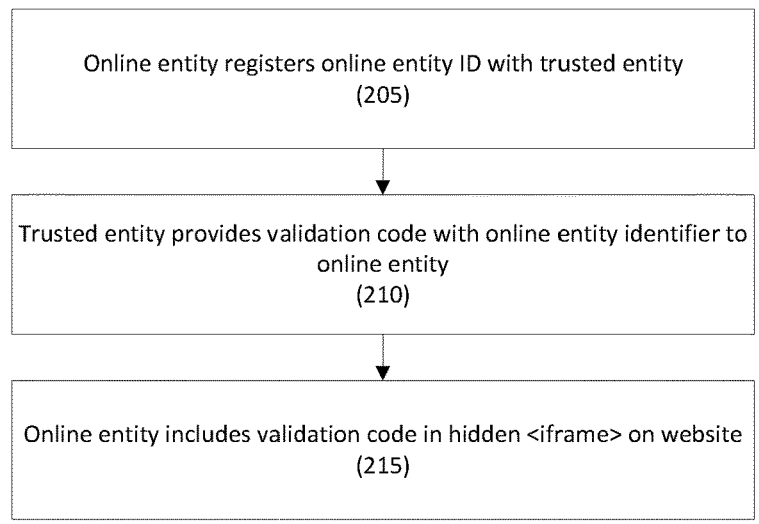
FIG. 2 depicts a method for online entity registration with a trusted entity according to an embodiment.

Referring to FIG. 2, a method for online entity registration with a trusted entity is provided according to an embodiment. In step 205, an online entity may register an online entity identifier with a trusted entity. In one embodiment, the online entity may provide the online entity identifier; in another embodiment, the online entity may be assigned the online entity identifier by the trusted entity.

In one embodiment, during registration, the trusted entity and the online entity may exchange their respective public keys to enable validation of a signature that may be added to each interaction to increase security.

In step 210, the trusted entity may provide validation code to the online entity for inclusion in an <iframe> on the online entity's website. In one embodiment, the trusted entity may include the online entity identifier in the validation code.

In one embodiment, a signature or hash of the data being provided may be passed to ensure the data has not been tampered with.

In one embodiment, the trusted entity may securely provide a shared secret for hashing using an out-of-band communication.

In step 215, the online entity may include the validation code in an <iframe> on the online entity's website.

In one embodiment, the online entity "receives" data, such as the validation code, as a result of the <iframe> being executed by the device. The page hosting the <iframe> will may include code that exchanges the data from the <iframe> to the main page so it can be posted back to the website and the backend.

In one embodiment, an online entity may register its website multiple times. This may be useful, for example, where the online entity hosts multiple entities in a shared environment.

Figure 3:
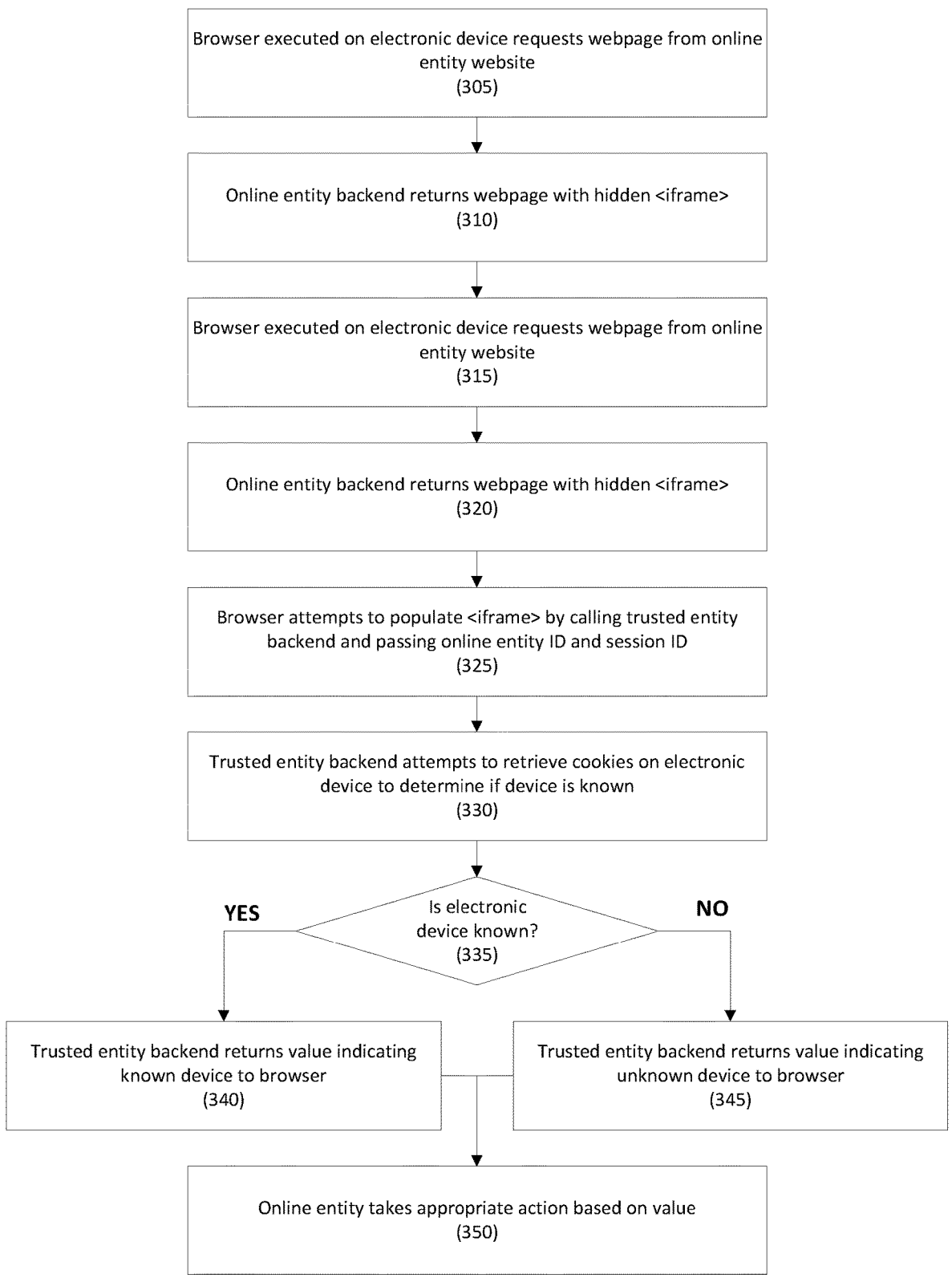
FIG. 3 depicts a method for trusted entity-provided online security to an online entity according to an embodiment.

Referring to FIG. 3, a method for trusted entity-provided online security to an online entity is provided according to an embodiment.

In step 305, a browser executed by a user electronic device may log into a trusted entity website, such as a website for a financial institution. In another embodiment, the electronic device may also access the trusted entity by using an app provided by the trusted entity.

In step 310, the trusted entity may store a cookie on the electronic device. The cookie may include the trusted entity identifier.

In step 315, a browser executed by a user electronic device may browse to an online entity website and may request a webpage.

In step 320, a backend for the online entity may return a webpage that includes a hidden <iframe>. The hidden <iframe> may include the online entity identifier, a URL for the trusted entity, a signature or hash for validation, etc.

In step 325, the browser may attempt to populate the hidden <iframe> by calling the trusted entity backend with the online entity identifier and a session identifier. A signature or hash may also be provided.

In step 330, the trusted entity may attempt to retrieve one or more cookies that it has stored on the electronic device.

In step 335, if the cookie is present on the electronic device, in step 340, the trusted entity backend may return a value to the browser indicating that the electronic device is known to the trusted entity. For example, the value may be a Boolean value, such as "1" for trusted, "0" for untrusted. Any suitable scheme for communicating whether the electronic device is known may be used as is necessary and/or desired. The signature or hash may be used to prevent spoofing.

In one embodiment, the trusted entity may verify that the trusted entity identifier in the cookie is the trusted entity's trusted entity identifier.

If the cookie is not present on the electronic device, or if the trusted entity identifier does not match, in step 345, the trusted entity may return a value indicating that the electronic device is not known to the trusted entity. Any suitable scheme may be used as is necessary and/or desired.

In step 350, the online entity may take an appropriate action based on the value. For example, the online entity may proceed with a transaction if the value indicates that the electronic device is known. If the value indicates that the electronic device is not known, the online entity may require additional authentication (e.g., out of band authentication) before proceeding.

Figure 4:
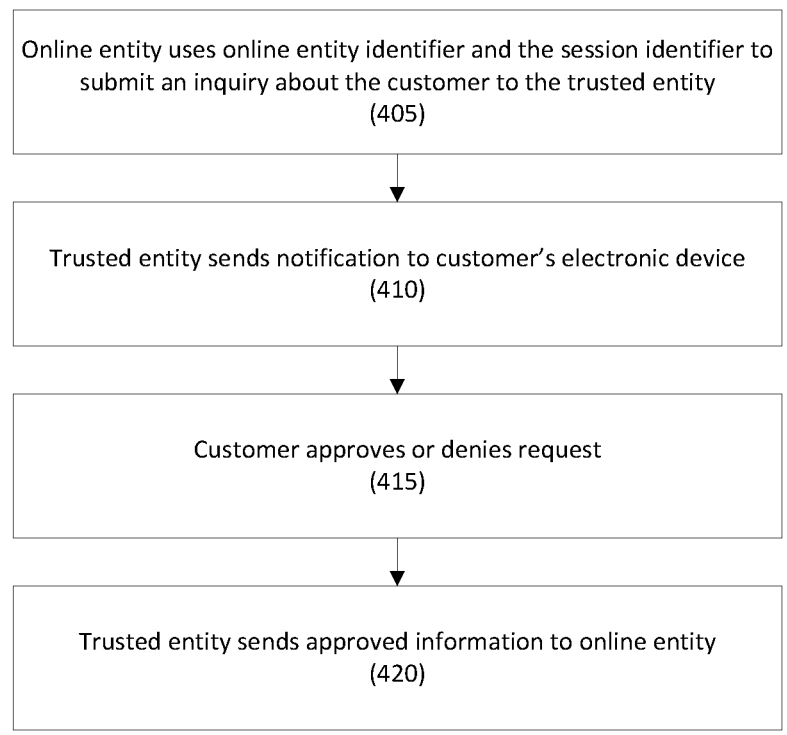
FIG. 4 depicts a method for trusted entity-provided online security and data sharing according to an embodiment.

In one embodiment, the appropriate action may be data sharing. FIG. 4 depicts a method for trusted entity-provided online security and data sharing according to an embodiment.

In step 405, the online entity may use the online entity identifier and the session identifier to submit an inquiry about the customer to the trusted entity. In one embodiment, the inquiry may be a long-running request, and may require one or more call backs to the online entity, polling, etc. Examples of information requested in the inquiry may include customer demographics, financial data, scores, etc. Any other information may be requested as is necessary and/or desired.

In step 410, the trusted entity may send a push notification to the trusted entity's application on the electronic device requesting approval for the trusted entity to share information with the online entity. Any other suitable messaging (e.g., SMS to a registered number, etc.) may be used as is necessary and/or desired.

In step 415, the customer may approve or deny the request in any suitable manner. In one embodiment, the customer may be authenticated before approving or denying the request. In addition, the authenticated customer may be required to be the same customer as the one associated with the cookie stored on the electronic device.

In one embodiment, the customer may select the amount of information to provide to the online entity, any data obfuscation and/or generalization (e.g. merchant types instead of merchant names, general amounts instead of exact amounts, etc.) as is necessary and/or desired.

In step 420, the trusted entity may send the approved information to the online entity. For example, the trusted entity may provide offers, promotions, discounts, etc. in the online entity's flows. This may further enhance the checkout process if the online entity is a merchant.

In one embodiment, the data may be in the clear or encrypted. The trusted entity may encrypt the data using the online entity's public key.

In one embodiment, the approved information may be provided in an <iframe> or similar. In one embodiment, the online entity may call the trusted entity backend to retrieve the approved information.

As another example, the online entity may request know your customer, Office of Foreign Assets Control ("OFAC") verification, etc. from the trusted entity.

Figure 5:
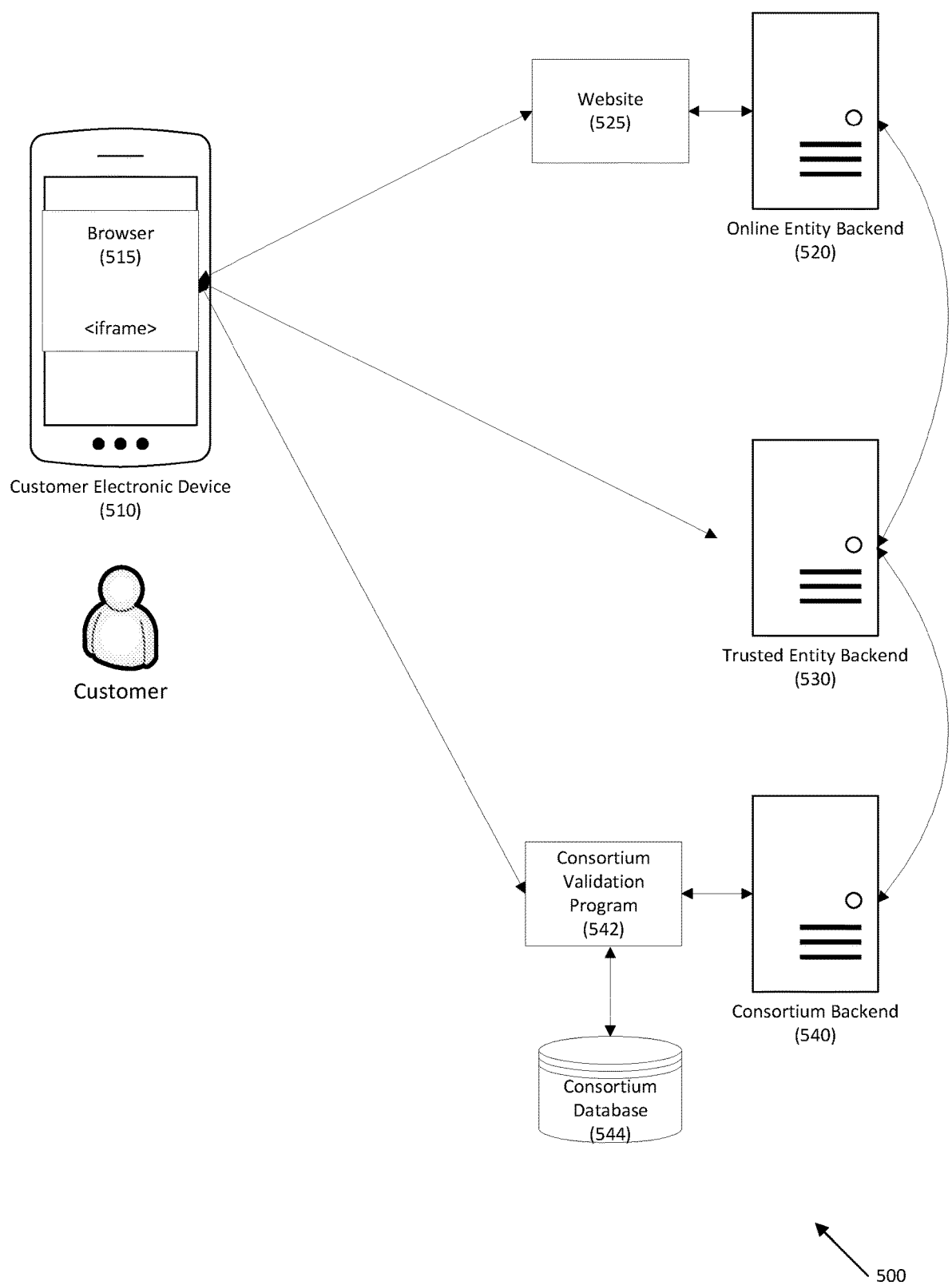
FIG. 5 depicts a system for consortium-provided online security according to an embodiment.

Referring to FIG. 5, a system for consortium-provided online security is provided according to an embodiment. System 500 may include customer electronic device 510, which may be any suitable electronic device, including computers (e.g., workstations, desktops, notebooks, tablets, etc.), smart devices (e.g., smart phones), Internet of Things ("IoT") devices, etc. Electronic device 510 may execute browser 515 that may access website 525 hosted by online entity backend 520.

Online entity backend 520 may be for any suitable online entity, including merchants, subscription services, etc.

Browser 515 may further communicate with trusted entity backend 530. Trusted entity backend 530 may be provided by any suitable trusted entity, including financial institutions, government agencies, security providers, etc.

Browser 515 may further communicate with consortium validation computer program 542 that may be provided by consortium backend 540. Consortium backend 540 may be provided by any suitable trusted entity, such as a consortium of trusted entities, including financial institutions, government agencies, security providers, etc.

In one embodiment, browser 515 may receive a hidden <iframe> from website 525.

In one embodiment, after receiving a communication from browser 515, consortium validation computer program 542 may determine whether it recognizes electronic device 510 based on the presence of a cookie. If the cookie is present, consortium validation computer program 542 may return a value to browser 515 indicating that electronic device 510 is known; if the cookie is not present, consortium validation computer program 542 may return a value to browser 515 indicating that electronic device 510 is not known.

In one embodiment, consortium validation computer program 542 may store an association between electronic device 510 and the cookie(s) stored on electronic device 510 in database 544.

In one embodiment, trusted entity backend 530 may host a hidden <iframe> on a secure website (e.g., a website that may require customer authentication) that may point to a website hosted by consortium backend 540. This may allow the consortium to know that electronic device 510 is trusted by the trusted entity, and facilitates consortium backend 540 to place its cookie on electronic device 510.

Figure 6:
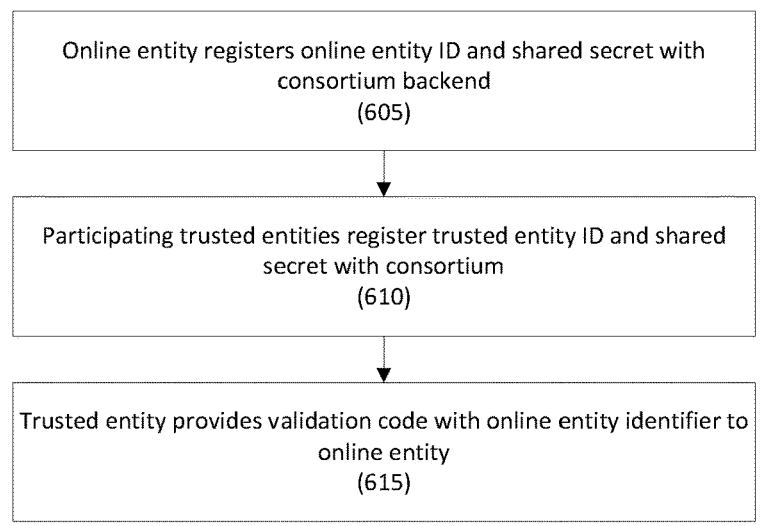
FIG. 6 depicts a method for online entity registration and trusted entity registration with a consortium according to an embodiment.

Referring to FIG. 6, a method for online entity registration and trusted entity registration with a consortium is provided according to an embodiment.

In step 605, an online entity may register an online entity identifier and a shared secret with a consortium backend. In one embodiment, the online entity may provide the online entity identifier to the consortium backend, or the consortium backend may generate the online entity identifier for the online entity.

In step 610, one or more trusted entities that form the consortium may register their trusted entity identifiers and shared secrets with the consortium backend. In one embodiment, the trusted entity may provide the trusted entity identifier to the consortium backend, or the consortium backend may generate the trusted entity identifier for the trusted entity.

In step 615, the trusted entity may provide validation code to the online entity. The validation code may include the online entity identifier. In one embodiment, the validation code may further include an identifier for the trusted entity, and may be digitally signed to ensure that it is valid.

In one embodiment, the online entity may be required to register with the consortium backend, while the trusted entities may not be required to do so.

Figure 7:
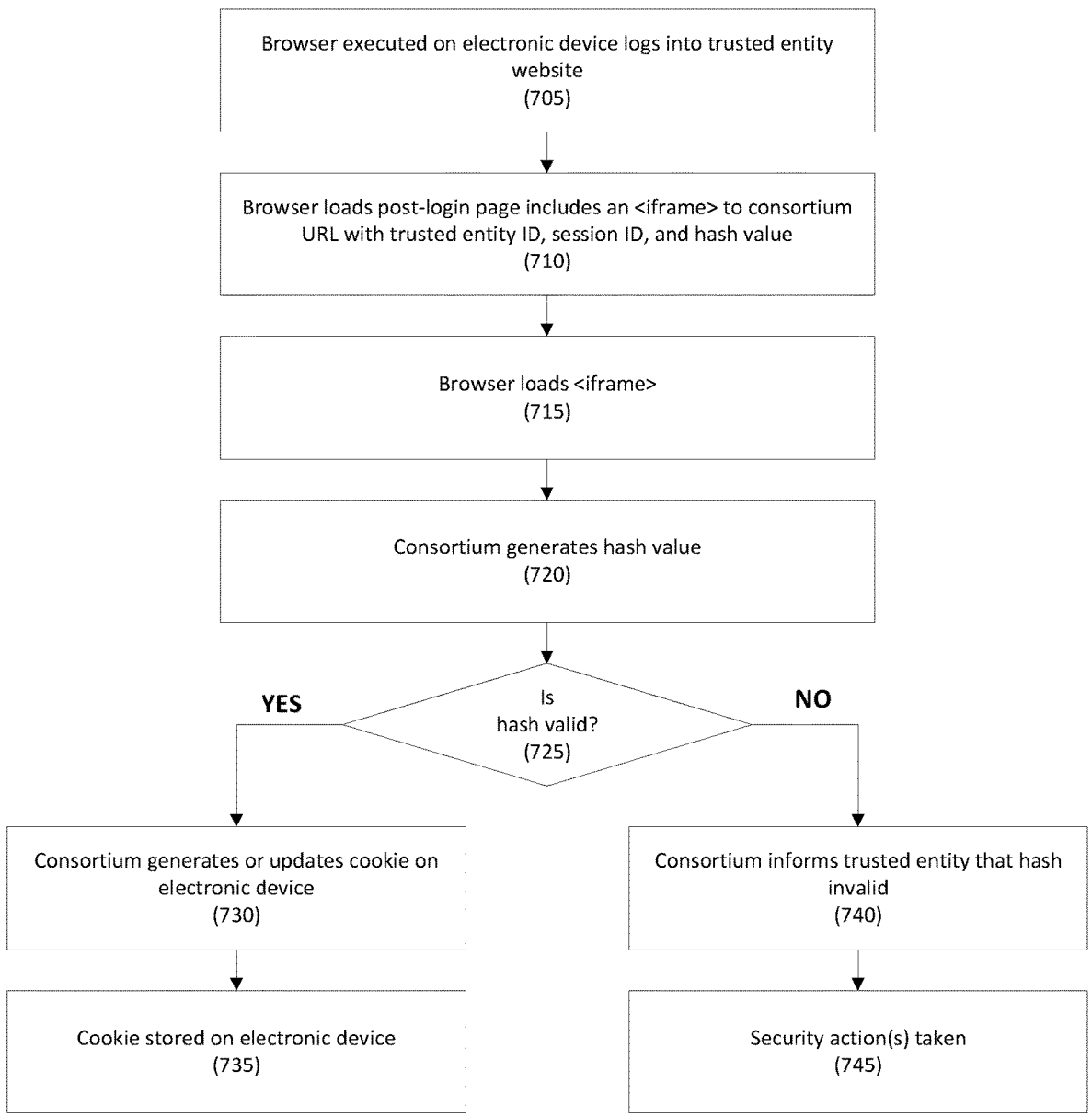
FIG. 7 depicts a method for electronic device registration with consortium-provided online security according to an embodiment.

Referring to FIG. 7, a method for electronic device registration with consortium-provided online security is provided according to an embodiment.

In step 705, a browser executed on an electronic device may log into a trusted entity website.

In step 710, the browser may load a post-login webpage that may include an <iframe>. The <iframe> may include a link to a URL for the consortium and may include the trusted entity identifier, a session identifier, and a hash value. The hash value may be a hash of the trusted entity identifier, the session identifier, and the shared secret may be a SALT.

The SALT or public key may be used to enable hashing or signing.

In step 715, the browse may load the <iframe> that provides the information to the URL. In step 720, the consortium backend may generate a hash value based on the trusted entity identifier, the session identifier, and the registered shared secret.

In step 725, if the hash is value, in step 730, the consortium backend may generate or update a cookie on the electronic device. In step 735, the electronic device may store the cookie.

In step 725, if the hash is not valid, in step 740, the consortium backend may inform the trusted entity that the hash is invalid. In step 745, the trusted entity may take one or more security actions, such as unregistering the customer device, contacting the customer regarding potential fraud, etc. If the trusted entity is a financial institution, the trusted entity may increase its fraud stance on any customer accounts.

Figure 8:
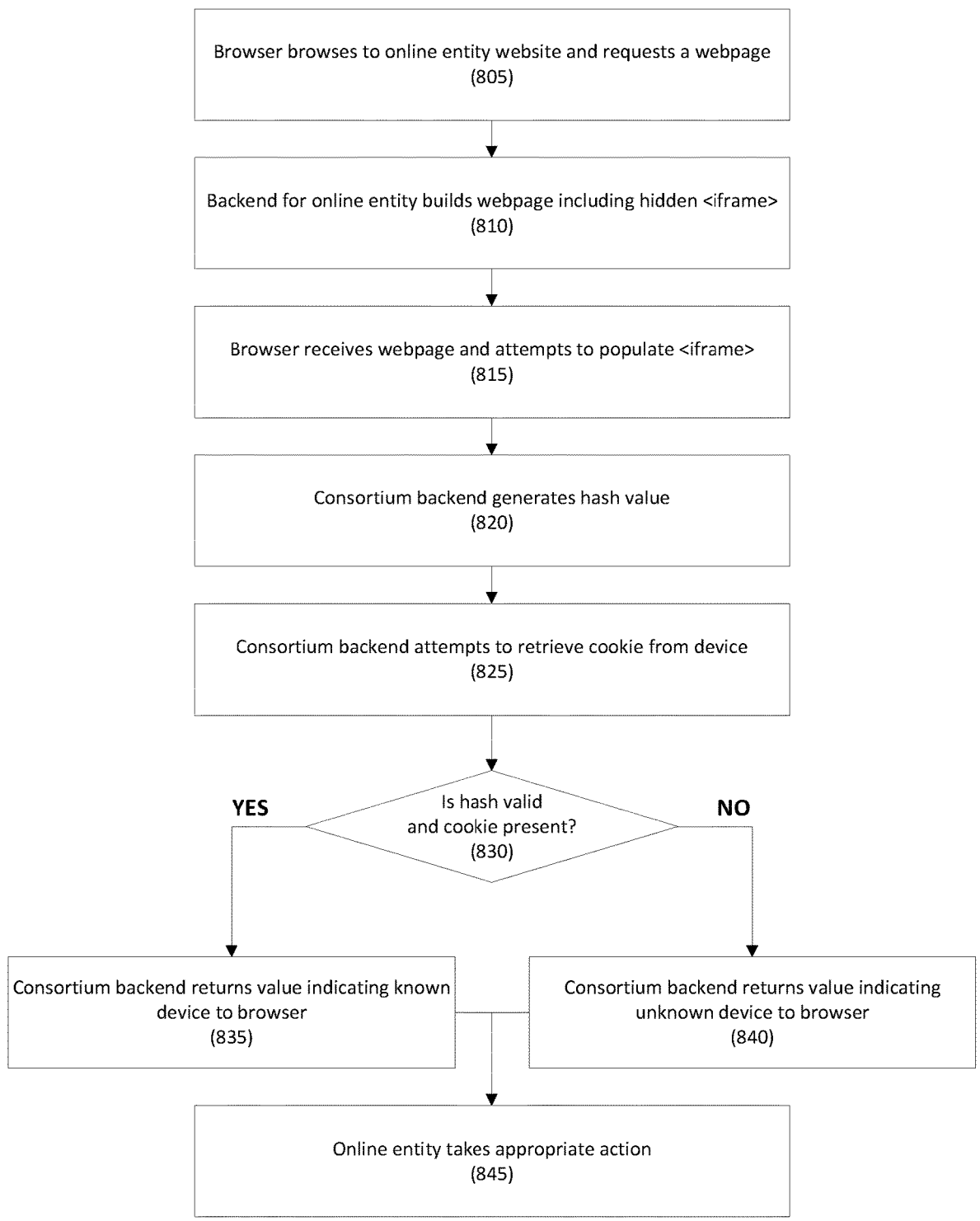
FIG. 8 depicts a method for consortium-provided online security to an online entity according to an embodiment.

Referring to FIG. 8, a method for consortium-provided online security to an online entity is provided according to an embodiment.

In step 805, a browser executed by a user electronic device may browse to an online entity website and may request a webpage.

In step 810, a backend for the online entity may build a webpage that includes a hidden <iframe> that includes the consortium URL, the online entity identifier, a session identifier, and the hash value derived from the online entity identifier, the session identifier, and the shared secret for the online entity.

In step 815, the browser receives the webpage and attempts to populate the hidden <iframe> by calling the consortium backend with the online entity identifier, session identifier, and hash value.

In step 820, the consortium backend may generate a hash value based on the online entity identifier, the session identifier, and the registered shared secret for the online entity.

In step 825, the consortium backend may attempt to retrieve the cookie from the electronic device.

In step 830, if the hash is valid and the cookie is present, in step 835, the consortium backend may return a value to the browser indicating that the electronic device is known to the trusted entity. For example, the value may be a Boolean value, such as "1" for trusted, "0" for untrusted. Any suitable scheme for communicating whether the electronic device is known may be used as is necessary and/or desired.

In one embodiment, instead of a Boolean value, the consortium backend may provide a value that may indicates the number of trusted entities that trust the electronic device. The value may be communicated in the clear, or it may be encrypted or encoded.

If the cookie is not present on the electronic device, or if the has value is not valid, in step 840, the consortium backend may return a value indicating that the electronic device is not known to the consortium backend. Any suitable scheme may be used as is necessary and/or desired.

In step 845, the online entity may take an appropriate action based on the value. For example, the online entity may proceed with a transaction if the value indicates that the electronic device is known. If the value indicates that the electronic device is not known, the online entity may require additional authentication (e.g., out of band authentication) before proceeding.

In one embodiment, when an entity in the consortium detects that an electronic device has been compromised, it may alert the consortium, which may update any other participating entities that the electronic device should be treated as suspect.

Figure 9:
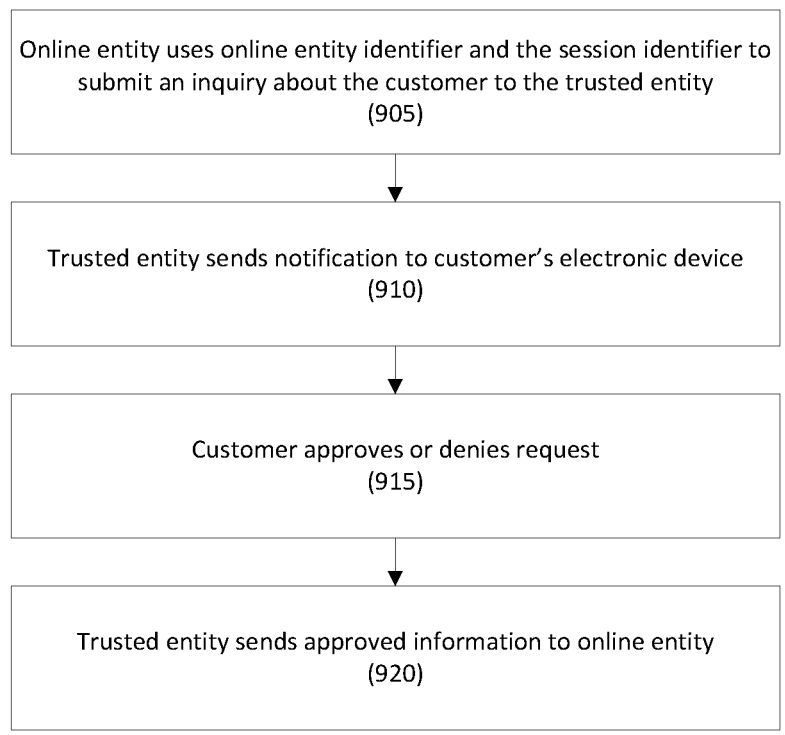
FIG. 9 depicts a method for consortium-provided online security and data sharing according to an embodiment.

In one embodiment, the appropriate action may be data sharing. Referring to FIG. 9, a method for consortium-provided online security and data sharing is disclosed according to an embodiment.

In embodiments, the consortium may proxy calls to the trusted entity backend and may broker communications. In another embodiment, consortium may provide the online entity with a URL and signed token that may be used to access the trusted entity directly.

In one embodiment, the online entity may request data sharing from the trusted entity directly, or via the consortium. For example, if the consortium is involved, the consortium may connect with the trusted entity to retrieve the information in a secure fashion. The information may be encrypted so that the consortium cannot access the information, but the online entity can receive and decrypt the information.

If only the trusted entity is involved, the trusted entity may call the consortium with the data received from the online entity party to validate that the consortium has been given permission to share the data.

In step 905, the online entity may use the online entity identifier and the session identifier to submit an inquiry about the customer to the trusted entity or to toe consortium. In one embodiment, the inquiry may be a long-running request, and may require one or more call backs to the online entity, polling, etc. Examples of information requested in the inquiry may include customer demographics, financial data, scores, etc. Any other information may be requested as is necessary and/or desired.

In step 910, the trusted entity or consortium may send a push notification to the trusted entity's application on the electronic device requesting approval for the trusted entity to share information with the online entity. Any other suitable messaging (e.g., SMS to a registered number, etc.) may be used as is necessary and/or desired.

In step 915, the customer may approve or deny the request in any suitable manner. In one embodiment, the customer may be authenticated before approving or denying the request. In addition, the authenticated customer may be required to be the same customer as the one associated with the cookie stored on the electronic device.

In one embodiment, the customer may select the amount of information to provide to the online entity, any data obfuscation and/or generalization (e.g. merchant types instead of merchant names, general amounts instead of exact amounts, etc.) as is necessary and/or desired.

In step 920, the trusted entity may send the approved information to the online entity. In one embodiment, the data may be in the clear or encrypted. The trusted entity may encrypt the data using the online entity's public key, or it may be brokered by the consortium, etc.

Figure 10:
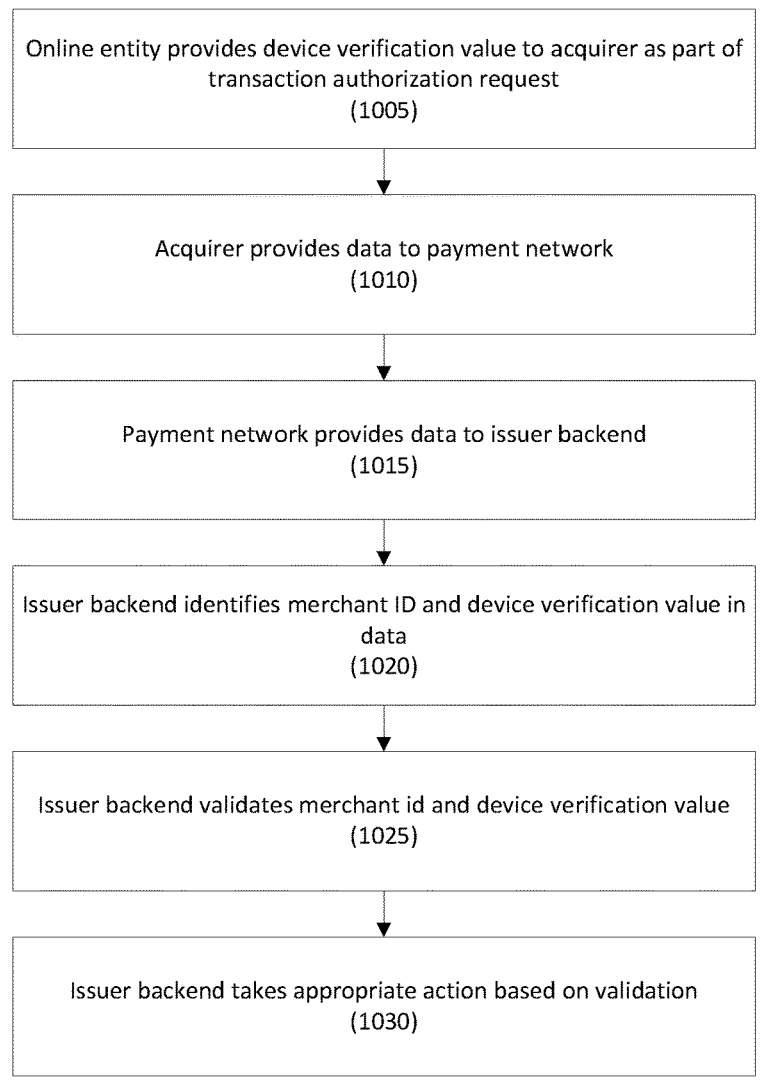
FIG. 10 depicts a method for enhanced authorization is provided according to one embodiment.

Referring to FIG. 10, a method for authorization is provided according to one embodiment. For example, an online entity, such as a merchant, may have its merchant identifier (MID) or terminal identifier (TID) with its acquirer associated with the online identifier provided to the consortium and/or trusted entity.

In step 1005, the online entity may provide the value provided by the trusted entity (e.g., device verification value) to the acquirer in a transaction authorization field (e.g., field 104 or similar) with transaction details, the online entity's merchant id, etc.

In step 1010, the acquirer may provide the information to the payment network, which in step 1015 provides the information to the issuer of the financial instrument. In one embodiment, the issuer may be the trusted entity.

In step 1020, the issuer's backend may identify the merchant id and the device verification value, and in step 1025, may validate the merchant id and value against device verification value in the methods described above. In one embodiment, the issuer backend may validate the device verification value with the provider of the device verification value (e.g., a trusted entity or consortium).

In one embodiment, the issuer backend may associate the transaction received from the online entity over the payment network with a device validation request received from the online entity for additional security. In one embodiment, the device validation request from the online entity and the authorization request received over the payment network may be required to be received within a predetermined amount of time.

In step 1030, the issuer backend may take an appropriate action based on the validation, such as authorizing a transaction, offering discounts, promotions, etc. to the customer, etc.

Embodiments may increase a level of trust, and the trusted entity may offer an increased credit limit, etc. to the customer.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above.

Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for providing online security, comprising:
   receiving a request from a web browser executed on a customer electronic device for a webpage for an online entity;
   returning, by a validation computer program executed by a trusted entity backend for a trusted entity, a webpage including a hidden iframe comprising code;
   receiving, based on execution by the browser of the code included in the hidden iframe, a call to a trusted entity comprising an online entity identifier for the online entity, a session identifier, and a hash value derived from the online entity identifier;
   generating, by the validation computer program, a generated hash value based on a shared secret for the online entity;
   confirming, by the validation computer program, that the generated hash value matches the hash value;
   confirming, by the validation computer program, that a cookie for the trusted entity is stored on the customer electronic device;
   determining, by the validation computer program and based on confirmation that the cookie for the trusted entity is stored on the customer electronic device, that the customer electronic device is known by the validation computer program; and
   returning, by the validation computer program and to the iframe of the web browser, a device verification value indicating that the customer electronic device is known to the trusted entity.

2. The method of claim 1, further comprising:
   receiving, by the validation computer program, a login from an application executed by the customer electronic device; and
   storing by the validation computer program, the cookie on the customer electronic device.

3. The method of claim 1, wherein the code in the hidden iframe comprises a URL for the trusted entity for the call.

4. The method of claim 1, further comprising:
   receiving, by the validation computer program, a request for information from the online entity;
   sending, by the validation computer program and to the customer electronic device, a request to approve release of the information to the online entity;
   receiving, by the validation computer program and from the customer electronic device, approval to release the information to the online entity; and
   releasing, by the validation computer program, the information to the online entity.

5. The method of claim 4, wherein the request to approve release of the information is communicated to an application for the trusted entity executed by the customer electronic device.

6. The method of claim 4, further comprising:
   receiving, by the validation computer program and from the customer electronic device, an amount of the information to release to the online entity;
   wherein the validation computer program releases the information to the online entity in accordance with the amount of information.

7. A method for providing online security, comprising:
   receiving a request from a web browser executed on a customer electronic device for a webpage for an online entity;
   returning, by a validation computer program executed by a trusted entity backend for a trusted entity, a webpage including a hidden iframe comprising code;
   receiving, based on execution by the browser of the code included in the hidden iframe, a call to the trusted entity comprising an online entity identifier for the online entity, a first session identifier, and a first hash value derived from the online entity identifier;

generating, by the validation computer program, a first generated hash value based on the online entity identifier, the first session identifier, and a shared secret for the online entity;

confirming, by the validation computer program, that the first generated hash value matches the first hash value;

confirming, by the validation computer program, that a cookie for the consortium of trusted entities is stored on the customer electronic device;

determining, by the validation computer program and based on confirmation that the cookie for the consortium of trusted entities is stored on the customer electronic device, that the customer electronic device is known by the validation computer program; and returning, by the validation computer program and to the iframe of the web browser, a device verification value indicating that the customer electronic device is known to the consortium of trusted entities.

8. The method of claim 7, further comprising:
receiving, by the validation computer program, the shared secret for the online entity in a registration process for the online entity.

9. The method of claim 7, further comprising:
receiving, by the validation computer program and from a second web browser trusted entity website, a second call comprising a trusted entity identifier, a second session identifier, and the first hash value;

generating, by the validation computer program, a second generated hash value based on the trusted entity identifier, the second session identifier, and the shared secret;

confirming, by the validation computer program, that the second generated hash value matches the first hash value;

generating or updating, by the validation computer program, the cookie in response to the confirmation; and storing, by the validation computer program, the cookie on the customer electronic device.

10. The method of claim 7, further comprising:
receiving, by the validation computer program and from a second web browser browsing a trusted entity website, a second call comprising a trusted entity identifier, a second session identifier, and the first hash value;

generating, by the validation computer program, a second generated hash value based on the trusted entity identifier, the second session identifier, and the shared secret;

determining, by the validation computer program, that the second generated hash value matches the first hash value; and executing, by the validation computer program, a security action in response to the second generated hash value not matching the first hash value.

11. The method of claim 10, wherein the trusted entity website comprises a second hidden iframe comprising code that causes the web browser to execute a second call, the second call comprising a URL for the consortium of trusted entities.

12. The method of claim 10, wherein the security action comprises unregistering the customer electronic device.

13. The method of claim 7, further comprising:
receiving, by the validation computer program, a request for information from the online entity;

sending, by the validation computer program and to the customer electronic device, a request to approve release of the information to the online entity;

receiving, by the validation computer program and from the customer electronic device, approval to release the information to the online entity; and releasing, by the validation computer program, the information to the online entity.

14. The method of claim 13, wherein the request to approve release of the information is communicated to an application for one of the trusted entities in the consortium of trusted entities.

15. The method of claim 13, further comprising:
receiving, by the validation computer program and from the customer electronic device, an amount of the information to release to the online entity;

wherein the validation computer program releases the information to the online entity in accordance with the amount of information.

* * * * *